United States Patent
Czaplewski et al.

(10) Patent No.: US 10,280,269 B2
(45) Date of Patent: *May 7, 2019

(54) FLAME-RETARDANT CROSS-LINKED EPDM RUBBER

(71) Applicant: International Business Machines Corporation, Armonk, NY (US)

(72) Inventors: Sarah K. Czaplewski, Rochester, MN (US); Joseph Kuczynski, North Port, FL (US); Jason T. Wertz, Pleasant Valley, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,130

(22) Filed: Dec. 12, 2017

(65) Prior Publication Data

US 2018/0100042 A1 Apr. 12, 2018

Related U.S. Application Data

(63) Continuation of application No. 14/867,404, filed on Sep. 28, 2015, now Pat. No. 9,879,121.

(51) Int. Cl.

| | | |
|---|---|---|
| *C08J 3/24* | (2006.01) | |
| *C08C 19/24* | (2006.01) | |
| *C08L 23/16* | (2006.01) | |
| *C08F 232/08* | (2006.01) | |
| *C08F 210/18* | (2006.01) | |
| *C08F 8/40* | (2006.01) | |
| *C08F 210/06* | (2006.01) | |
| *C08G 61/08* | (2006.01) | |
| *C09K 21/14* | (2006.01) | |
| *C08K 5/5313* | (2006.01) | |
| *C08F 214/02* | (2006.01) | |
| *C08C 19/28* | (2006.01) | |
| *C08F 4/659* | (2006.01) | |

(52) U.S. Cl.

CPC ............ *C08J 3/24* (2013.01); *C08F 8/40* (2013.01); *C08F 210/06* (2013.01); *C08F 210/18* (2013.01); *C08F 214/02* (2013.01); *C08F 232/08* (2013.01); *C08G 61/08* (2013.01); *C08K 5/5313* (2013.01); *C09K 21/14* (2013.01); *C08C 19/24* (2013.01); *C08C 19/28* (2013.01); *C08F 4/65908* (2013.01); *C08J 2319/00* (2013.01); *C08J 2323/16* (2013.01); *C08L 23/16* (2013.01)

(58) Field of Classification Search

CPC ......... C08L 23/16; C08J 3/24; C08J 2319/00; C08J 2323/16; C08J 2315/00; C08J 2315/02; C08F 210/18; C08F 8/40; C08F 232/08; C08K 5/53; C08C 19/24; C08C 19/28

USPC .............................................. 525/331.7, 340

See application file for complete search history.

(56) References Cited

U.S. PATENT DOCUMENTS

| | | | |
|---|---|---|---|
| 3,887,648 A | 6/1975 | Takahashi et al. | |
| 3,906,059 A | 9/1975 | Oba et al. | |
| 3,956,247 A | 5/1976 | Landi et al. | |
| 3,978,162 A | 8/1976 | Nakanishi et al. | |
| 4,021,508 A | 5/1977 | Nakanishi et al. | |
| 4,278,771 A | 7/1981 | Weil | |
| 4,652,616 A | 3/1987 | Kamiya et al. | |
| 4,769,179 A | 9/1988 | Kato et al. | |
| 4,959,420 A | 9/1990 | Davis et al. | |
| 6,403,220 B1 | 6/2002 | Brennan et al. | |
| 6,969,756 B2 | 11/2005 | Brennan et al. | |
| 7,767,736 B2 | 8/2010 | Baran, Jr. | |
| 7,781,517 B2 | 8/2010 | Hong et al. | |
| 7,838,593 B2 | 11/2010 | Ku et al. | |
| 9,879,121 B2* | 1/2018 | Czaplewski | ............... C08J 3/24 |
| 2011/0251312 A1* | 10/2011 | Hill | ............ C07F 9/305 |
| | | | 524/126 |
| 2014/0018481 A1 | 1/2014 | Basfar | |
| 2014/0065410 A1* | 3/2014 | Kousaka | ................... C09J 7/26 |
| | | | 428/317.3 |
| 2015/0203693 A1 | 7/2015 | Mestan | |
| 2017/0088679 A1 | 3/2017 | Czaplewski et al. | |

FOREIGN PATENT DOCUMENTS

| | | |
|---|---|---|
| CN | 102911439 A | 2/2013 |
| CN | 102675801 B | 4/2014 |
| CN | 103756166 A | 4/2014 |
| CN | 104086897 A | 10/2014 |
| CN | 103483708 B | 4/2015 |
| CN | 104558868 A | 4/2015 |
| JP | 60155250 A | 8/1985 |
| JP | 60181149 A | 9/1985 |
| JP | 3374482 B2 | 2/2003 |
| JP | 07157612 B2 | 2/2003 |
| WO | 2015103006 A1 | 7/2015 |

OTHER PUBLICATIONS

Ewart et al., Topics in Catalysis 7 (1999) 1-8.*
List of IBM Patents or Applications Treated As Related, Mar. 2018.
Bavarian, Neda et al., "EPDM Synthesis by the Ziegler Catalyst Cp*TiMe3/B(C6F5)3," Macromol_ Chem_ Phys., 2001, 202, pp. 3248-3252.
Ewart, Sean Wet al., "Olefin polymerization by pentamethylcyclopentadienyl trimethyltitanium, Cp*TiMe3," Topics n Catalysis 7, 1999, pp. 1-8.

(Continued)

*Primary Examiner* — Roberto Rabago

(74) *Attorney, Agent, or Firm* — Patterson + Sheridan, LLP

(57) ABSTRACT

In an example, a process includes polymerizing a mixture that includes an ethylene monomer, a propylene monomer, and a diene monomer to form an ethylene-propylene-diene (EPDM) terpolymer using ring-opening metathesis polymerization (ROMP). The process further includes chemically reacting the EPDM terpolymer with a norbornene-based phosphinate cross-linking material to form a flame-retardant, cross-linked EPDM rubber.

16 Claims, 3 Drawing Sheets

(56) References Cited

OTHER PUBLICATIONS

Wikipedia "Ring opening metathesis polymerization," https://en.wikipedia.org/wiki/Ring-opening_metathesis_polymerisation; 2016.
Takahashi, A. "Graft Copolymerization of Vinyl Chloride onto Ethylene Propylene Rubber (EPR) and Ethylene Proplenediene Monomer (EPDM) by Bulk Process", Polymer Engineering & Science, vol. 22, No. 1, 2004, http://onlinelibrary.wiley.com/doi/10.1002/pen.760, pp. 48-52.

* cited by examiner

FLAME-RETARDANT CROSS-LINKED EPDM RUBBER

CROSS-REFERENCE TO RELATED APPLICATIONS

This application is a continuation of U.S. patent application Ser. No. 14/867,404, filed Sep. 28, 2015, currently granted as U.S. Pat. No. 9,879,121. The aforementioned related patent application is herein incorporated by reference in its entirety.

I. FIELD OF THE DISCLOSURE

The present disclosure relates generally to flame-retardant, cross-linked ethylene-propylene-diene (EPDM) rubber.

II. BACKGROUND

Some high performance computing systems have migrated to water cooling solutions in order to more effectively remove heat. In some case, a water cooling system design may utilize flexible tubing in order to allow for incorporation of a large number of connections to cold plates/heat sinks. As cooling designs evolve to bring cooling inside nodes, reliability becomes a more important design consideration in order to reduce risk of catastrophic failure of electrical components.

III. SUMMARY OF THE DISCLOSURE

According to an embodiment, a process includes polymerizing a mixture that includes an ethylene monomer, a propylene monomer, and a diene monomer to form an ethylene-propylene-diene (EPDM) terpolymer using ring-opening metathesis polymerization (ROMP). The process further includes chemically reacting the EPDM terpolymer with a norbornene-based phosphinate cross-linking material to form a flame-retardant, cross-linked EPDM rubber.

According to another embodiment, a process includes polymerizing a mixture that includes a chlorinated ethylene monomer, a propylene monomer, and a diene monomer to form a chlorinated EPDM terpolymer using ROMP. The process also includes chemically reacting a norbornene-based alcohol and a phosphinate material to form a norbornene-based phosphinate cross-linking material. The process further includes chemically reacting the chlorinated EPDM terpolymer with the norbornene-based phosphinate cross-linking material to form a flame-retardant, cross-linked chlorinated EPDM rubber.

According to another embodiment, an article of manufacture is disclosed that includes a flame-retardant, cross-linked EPDM rubber that is cross-linked using a norbornene-based phosphinate cross-linking material.

An advantage of the present disclosure is the ability to incorporate flame retardancy characteristics to an EPDM rubber by directly attaching a flame retardant agent (e.g., phosphorus) to an EPDM terpolymer via a norbornene-based phosphinate cross-linking agent using ROMP. In some cases, a chlorinated ethylene monomer may be used to form a chlorinated EPDM terpolymer. Incorporating a halogen, such as chlorine, directly into an EPDM polymer chain may also provide flame retardancy benefits.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

The present disclosure relates to flame-retardant, cross-linked EPDM rubber materials and methods of preparing flame-retardant, cross-linked EPDM rubber materials. In the present disclosure, ring-opening metathesis polymerization may be used to polymerize a mixture of an ethylene monomer (e.g., chlorinated ethylene, in some cases), a propylene monomer, and a diene monomer to form an EPDM terpolymer. The EPDM terpolymer may be chemically reacted with a norbornene-based phosphinate cross-linking material to form a flame-retardant, cross-linked EPDM rubber. Utilization of a norbornene-based phosphinate material as a cross-linking agent may allow for incorporation of a flame retardant agent (phosphorus) directly into a backbone of an EPDM rubber material. Further, in cases where a chlorinated ethylene monomer is used to form the EPDM terpolymer, the incorporation of chlorine into the EPDM terpolymer chains may provide additional flame retardancy benefits.

Figure 1:
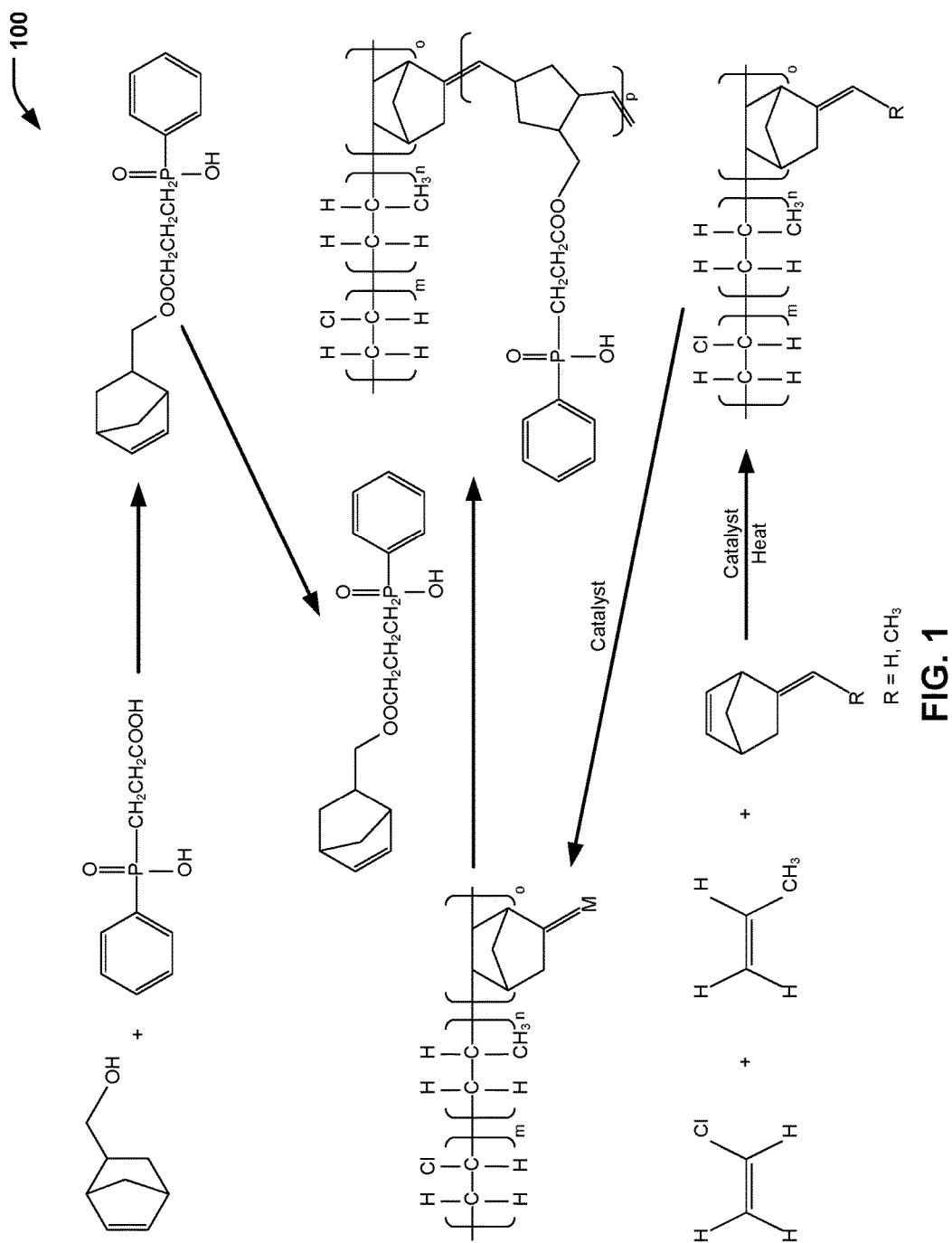
FIG. 1 is a chemical reaction diagram showing the preparation of a flame-retardant, cross-linked EPDM rubber, according to an embodiment.

Referring to FIG. 1, a chemical reaction diagram 100 illustrates the preparation of a flame-retardant, cross-linked EPDM rubber, according to one embodiment. FIG. 1 illustrates three chemical reactions. The chemical reaction depicted at the bottom of FIG. 1 illustrates the polymerization of a mixture that includes a chlorinated ethylene monomer, a propylene monomer, and a diene monomer to form a chlorinated EPDM terpolymer using ROMP. The chemical reaction depicted at the top of FIG. 1 illustrates the preparation of a norbornene-based phosphinate cross-linking material. The chemical reaction depicted in the middle of FIG. 1 illustrates that the norbornene-based phosphinate material may be used as a cross-linking agent to form a flame-retardant, cross-linked chlorinated EPDM rubber.

Referring to the chemical reaction depicted at the bottom of FIG. 1, a chlorinated ethylene monomer, a propylene monomer, and a diene monomer may be combined to form a mixture. FIG. 1 illustrates that, in some cases, 5-propylidene-2-norbornene may be used as the diene monomer (where R=CH$_3$), while in other cases the diene monomer may include 5-ethylidene-2-norbornene (where R=H), also referred to herein as ENB. Alternatively, the diene monomer may include a combination of 5-propylidene-2-norbornene and 5-ethylidene-2-norbornene, among other alternative and/or additional diene monomers.

In a particular embodiment, a weight percentage of the ethylene monomer (chlorinated ethylene, in this case) may be in a range of 30 to 80 weight percent of the mixture. In a particular embodiment, a weight percentage of the diene monomer may be in a range of 2 to 10 weight percent of the mixture. A weight percentage of the propylene monomer may be in a range of 10 weight percent to 68 weight percent, depending on the relative weight percentages of the ethylene/diene monomers in the mixture. It will be appreciated that the weight percentages of the monomers may be selected in order to form an EPDM terpolymer with a first portion (illustrated by the integer m) corresponding to the chlorinated ethylene monomer, a second portion (illustrated by the integer n) corresponding to the propylene monomer, and a third portion (illustrated by the integer o) corresponding to the diene monomer.

FIG. 1 illustrates that the mixture may be polymerized using ROMP chemistry (e.g., using one or more catalyst materials and heat). In a particular embodiment, a mixture of $Cp*TiMe_3$ and $B(C_6F_5)_3$ may be utilized as a catalyst material for ring-opening metathesis polymerization in order to form the chlorinated EPDM terpolymer illustrated in the example of FIG. 1. While not shown in FIG. 1, in some cases, at least a portion of the catalyst material(s) may remain after the ring-opening metathesis polymerization. In some cases, trace amounts of catalyst (e.g., at least a portion of the mixture of the $Cp*TiMe_3$ and $B(C_6F_5)_3$ catalyst materials) in a flame-retardant, cross-linked chlorinated EPDM rubber may be indicative of ROMP chemistry having been used to form a chlorinated EPDM terpolymer that is chemically reacted with a norbornene-based phosphinate cross-linking material (as shown in the chemical reaction depicted in the middle of FIG. 1).

Prophetic Example: Preparation of a Chlorinated EPDM Terpolymer

To a cooled (8° C.) glass reactor containing a solution of $Cp*TiMe_3$ (14 mg, 0.06 mmol) in 5 mL of toluene, a cooled (8° C.) solution of $B(C_6F_5)_3$ (31 mg, 0.06 mmol) in 5 mL of toluene may be added. The mixture may be bubbled for about 10 minutes through a mixture of vinyl chloride and propylene (e.g., in about a 1:1 ratio). To the EPDM polymerization reaction, diene monomer such as ENB (e.g., about 2-10 wt %) may be added prior to the addition of $B(C_6F_5)_3$. Bubbling of the vinyl chloride/propylene mixture through the stirred, cooled solution may be continued for about 5-10 minutes. After reaction time, the viscous mixture may be treated with methanol (5 mL). The reaction temperature during polymerization may increase to about 18° C. and may remain constant until termination of the reaction. The resultant chlorinated EPDM terpolymer may then be purified. In some cases, trace amounts of catalyst material (e.g., $Cp*TiMe_3$ and/or $B(C_6F_5)_3$) may remain after purification.

Referring to the chemical reaction diagram depicted at the top of FIG. 1, an example process of preparing a norbornene-based phosphinate cross-linking material is illustrated. FIG. 1 depicts an example in which a norbornene-based alcohol is chemically reacted with a phosphinate material to form the norbornene-based phosphinate cross-linking material. In the particular embodiment illustrated in FIG. 1, the norbornene-based alcohol includes 5-norbornene-2-methanol, and the phosphinate material includes 3-(hydroxyl(phenyl)phosphoryl)propanoic acid. In other cases, alternative and/or additional norbornene-based alcohol(s) and/or phosphinate material(s) may be selected. As depicted in the chemical reaction diagram illustrated in the middle of FIG. 1, relief of ring strain in the norbornene-based phosphinate cross-linking material may allow for phosphorus (P) to be directly attached to polymer chains of a chlorinated EPDM terpolymer in order to impart flame retardancy characteristics to a resulting cross-linked chlorinated EPDM rubber.

Prophetic Example: Preparation of Norbornene-Based Phosphinate Cross-Linking Material To a 250 mL round bottom flask fitted with a condenser, 5-Norbornene-2-methanol (100 mL) may be added followed by 3-(hydroxyl(phenyl)phosphoryl)propanoic acid (149 mmol) to form a mixture. The mixture may then be stirred under ambient temperature. Sulfuric acid (3.66 g; 37.3 mmol) may be added, followed by heating the reaction to about 65° C. and holding for about 3 hours. After reaction, the solution may be cooled below room temperature for about 6 hours to allow precipitation. The product may then be purified.

Referring to the chemical reaction illustrated in the middle of FIG. 1, the chlorinated EPDM terpolymer (after using a Ziegler catalyst to form an intermediate material, illustrated via the replacement of the letter R with the letter M in FIG. 1) may be chemically reacted with the norbornene-based phosphinate cross-linking material to form a flame-retardant, cross-linked chlorinated EPDM rubber. In a particular embodiment, an amount of norbornene-based phosphinate cross-linking material that is chemically reacted with the chlorinated EPDM terpolymer may be selected based on a desired degree of cross-linking, a desired weight percentage of phosphorus (P) to impart particular flame retardancy characteristics, or a combination thereof. In FIG. 1, the integer p is used to represent cross-linking locations. A degree of cross-linking may be adjusted by varying a stoichiometric ratio of the chlorinated EPDM terpolymer and the norbornene-based phosphinate cross-linking material.

In a particular embodiment, an amount of norbornene-based phosphinate cross-linking material that is chemically reacted with the chlorinated EPDM terpolymer may be sufficient for the flame-retardant, cross-linked chlorinated EPDM rubber to satisfy one or more plastics flammability standards. In some cases, additional flame retardant "packages" may be added in order to satisfy plastics flammability standard(s). To illustrate, a plastics flammability standard may be associated with heat-shrink tubing. As an example, the plastics flammability standard (e.g., associated with heat-shrink tubing) may include a burning stop rate of not greater than 60 seconds on a vertical specimen of an article of manufacture that includes the flame-retardant, cross-linked chlorinated EPDM rubber (e.g., EPDM rubber tubing for a water cooling application). In some cases, the plastics flammability standard may allow drips of non-inflamed particles but may not allow drips of flaming particles.

Prophetic Example: Cross-Linking of Chlorinated EPDM Terpolymer

To an internal mixer, chlorinated EPDM (94.3 wt %), elemental sulfur (0.7 wt %), an accelerator (such as MBT; 1 wt %), zinc oxide (3 wt %), and steric acid (1 wt %) may be added. Accelerators and activators and vulcanizing routes (e.g., sulfur, peroxide, etc.) may be selected by one of ordinary skill in the art. To the reaction, (3-((bicycle[2.2.1] hept-5-en-2-ylmethyl)peroxy)propyl)(phenyl)phosphinic acid (e.g., 1 equiv.) may be added. The mixture may then be heated in an internal mixture to about 130-140° C. The rubber may be cured at about 160-180° C.

Thus, FIG. 1 illustrates an example of a process of preparing a flame-retardant, cross-linked chlorinated EPDM rubber (e.g., for use as EPDM rubber tubing for a water cooling application, among other alternative uses). In the example of FIG. 1, the ethylene monomer (as shown in the chemical reaction illustrated at the bottom of FIG. 1) is chlorinated ethylene, resulting in the formation of a chlorinated EPDM terpolymer using ROMP chemistry. The chlorinated EPDM terpolymer may then be chemically reacted with a norbornene-based phosphinate cross-linking material to form a flame-retardant, cross-linked chlorinated EPDM rubber. FIG. 1 illustrates that utilization of a norbornene-based phosphinate material as a cross-linking agent may allow for incorporation of a flame retardant agent (phosphorus) directly into a backbone of an EPDM rubber material. Further, the incorporation of a halogen, such as chlorine, into the EPDM terpolymer chains may provide additional flame retardancy benefits.

Figure 2:
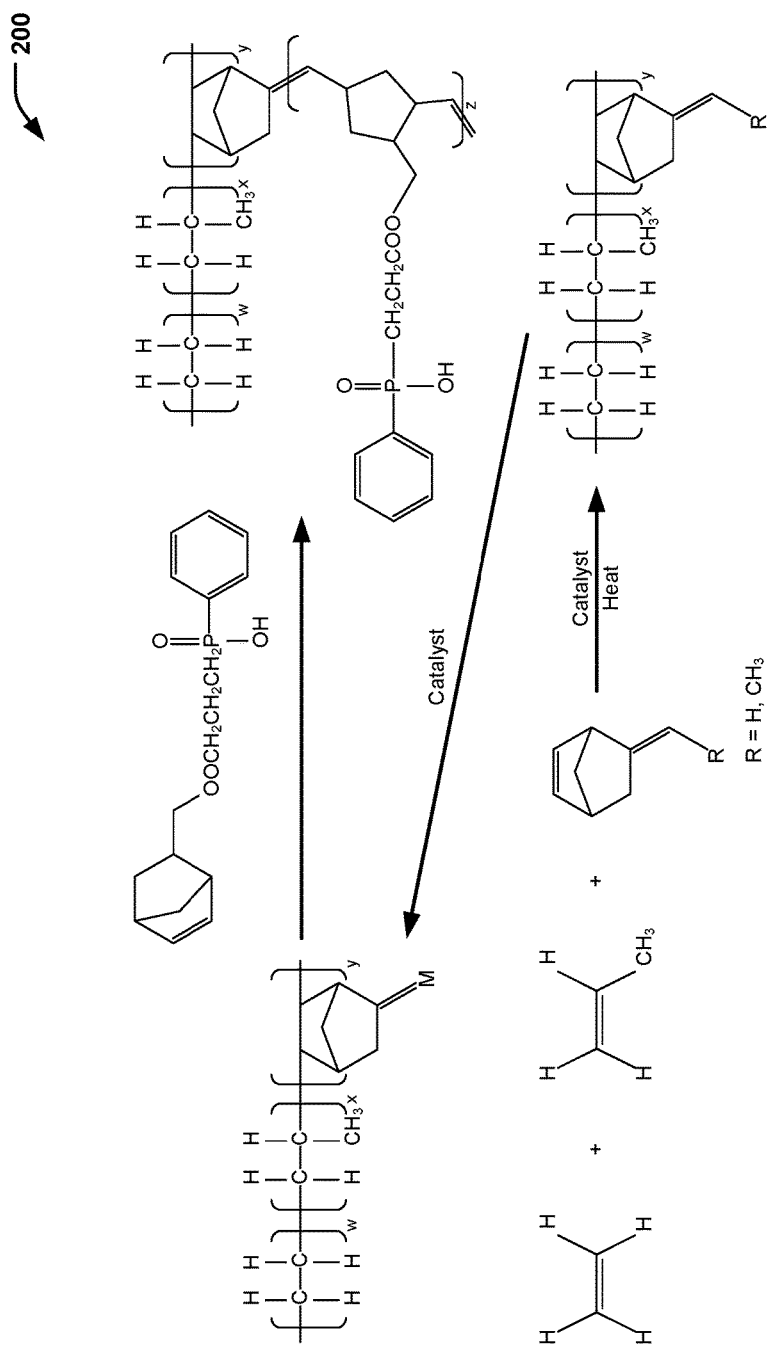
FIG. 2 is a chemical reaction diagram showing the preparation of a flame-retardant, cross-linked EPDM rubber, according to another embodiment.

Referring to FIG. 2, a chemical reaction diagram 200 illustrates the preparation of a flame-retardant, cross-linked EPDM rubber, according to another embodiment. FIG. 2 illustrates two chemical reactions. The chemical reaction depicted at the bottom of FIG. 2 illustrates the polymerization of a mixture that includes an ethylene monomer, a propylene monomer, and a diene monomer to form an EPDM terpolymer using ROMP chemistry. The chemical reaction depicted at the top of FIG. 2 illustrates that a norbornene-based phosphinate material may be used as a cross-linking agent to form a flame-retardant, cross-linked EPDM rubber. In a particular embodiment, the norbornene-based phosphinate material depicted in the example of FIG. 2 may be formed according to the process described herein with respect to FIG. 1.

Referring to the chemical reaction depicted at the bottom of FIG. 2, an ethylene monomer (ethylene, in contrast to the chlorinated ethylene of FIG. 1), a propylene monomer, and a diene monomer may be combined to form a mixture. FIG. 2 illustrates that, in some cases, 5-propylidene-2-norbornene may be used as the diene monomer (where R=$CH_3$). In other cases, the diene monomer may include 5-ethylidene-2-norbornene (where R=H), also referred to herein as ENB. Alternatively, the diene monomer may include a combination of 5-propylidene-2-norbornene and 5-ethylidene-2-norbornene, among other alternative and/or additional diene monomers.

It will be appreciated that the weight percentages of the monomers may be selected in order to form an EPDM terpolymer with a first portion (illustrated by the integer w) corresponding to the ethylene monomer, a second portion (illustrated by the integer x) corresponding to the propylene monomer, and a third portion (illustrated by the integer y) corresponding to the diene monomer. As the embodiment illustrated in FIG. 2 does not include a halogen (e.g., Cl) in the polymer backbone, a relative weight percentage of the diene monomer may be increased compared to a weight percentage of diene monomer in the example of FIG. 1. In some cases, the weight percentage of diene monomer may be adjusted such that, after cross-linking, an amount of phosphorus in the resulting cross-linked EPDM rubber is sufficient to satisfy one or more plastics flammability standards, such as a standard associated with heat-shrink tubing.

FIG. 2 illustrates that the mixture may be polymerized using ROMP chemistry (e.g., using one or more catalyst materials and heat). In a particular embodiment, a mixture of Cp*$TiMe_3$ and $B(C_6F_5)_3$ may be utilized as a catalyst material for ring-opening polymerization to form the EPDM terpolymer illustrated in the example of FIG. 2. While not shown in FIG. 2, in some cases, at least a portion of the ROMP catalyst material(s) may remain after polymerization. In some cases, detection of trace amounts of catalyst (e.g., at least a portion of the mixture of the Cp*$TiMe_3$ and $B(C_6F_5)_3$ catalyst materials) in a flame-retardant, cross-linked EPDM rubber may be indicative of ROMP chemistry having been used to form a EPDM terpolymer that is chemically reacted with a norbornene-based phosphinate cross-linking material (as shown in the chemical reaction depicted at the top of FIG. 2).

Prophetic Example: Preparation of EPDM Terpolymer

To a cooled (8° C.) glass reactor containing a solution of Cp*$TiMe_3$ (14 mg, 0.06 mmol) in 5 mL of toluene, a cooled (8° C.) solution of $B(C_6F_5)_3$ (31 mg, 0.06 mmol) in 5 mL of toluene may be added. The mixture may be bubbled for about 10 minutes through a mixture of ethylene and propylene (e.g., in about a 1:1 ratio). To the EPDM polymerization reaction, diene monomer such as ENB may be added prior to the addition of $B(C_6F_5)_3$. Bubbling of the ethylene/propylene mixture through the stirred, cooled solution may be continued for about 5-10 minutes. After reaction time, the viscous mixture may be treated with methanol (5 mL). The reaction temperature during polymerization may increase to about 18° C. and may remain constant until termination of the reaction. The resultant EPDM terpolymer may then be purified. In some cases, trace amounts of catalyst material (e.g., Cp*$TiMe_3$ and/or $B(C_6F_5)_3$ may remain after purification.

Referring to the chemical reaction illustrated at the top of FIG. 2, the EPDM terpolymer (after forming an intermediate material using a Ziegler catalyst, identified by the replacement of the letter R with the letter M in FIG. 2) may be chemically reacted with a norbornene-based phosphinate cross-linking material to form a flame-retardant, cross-linked EPDM rubber. FIG. 2 illustrates that the norbornene-based phosphinate cross-linking material may correspond to the norbornene-based phosphinate cross-linking material formed according to the process described with respect to FIG. 1. In a particular embodiment, an amount of norbornene-based phosphinate cross-linking material that is chemically reacted with the EPDM terpolymer may be selected based on a desired degree of cross-linking, a desired weight percentage of phosphorus (P) to impart particular flame retardancy characteristics, or a combination thereof. In FIG. 2, the integer z is used to represent cross-linking locations. A degree of cross-linking may be adjusted by varying a stoichiometric ratio of the EPDM terpolymer and the norbornene-based phosphinate cross-linking material.

In a particular embodiment, an amount of norbornene-based phosphinate cross-linking material that is chemically reacted with the EPDM terpolymer may be sufficient for the flame-retardant, cross-linked EPDM rubber to satisfy one or more plastics flammability standards. In some cases, additional flame retardant "packages" may be added in order to satisfy plastics flammability standard(s), such as a plastics flammability standard associated with heat-shrink tubing. As an example, a plastics flammability standard may include a burning stop rate of not greater than 60 seconds on a vertical specimen of an article of manufacture that includes the flame-retardant, cross-linked EPDM rubber (e.g., EPDM rubber tubing for a water cooling application). In some cases, the plastics flammability standard may allow drips of non-inflamed particles but may not allow drips of flaming particles.

Prophetic Example: Cross-Linking of EPDM Terpolymer

To an internal mixer, EPDM (94.3 wt %), elemental sulfur (0.7 wt %), an accelerator (such as MBT; 1 wt %), zinc oxide (3 wt %), and steric acid (1 wt %) may be added. Accelerators and activators and vulcanizing routes (e.g., sulfur, peroxide, etc.) may be selected by one of ordinary skill in the art. To the reaction, (3-((bicycle[2.2.1]hept-5-en-2-ylmethyl)peroxy)propyl)(phenyl)phosphinic acid (1 equiv.) may be added. The mixture may then be heated in an internal mixture to about 130-140° C. The rubber may be cured at about 160-180° C.

Thus, FIG. 2 illustrates an example of a process of preparing a flame-retardant, cross-linked EPDM rubber (e.g., for use as EPDM rubber tubing for a water cooling application, among other alternative uses). In contrast to the example of FIG. 1, FIG. 2 illustrates an example in which a non-chlorinated ethylene monomer is used, resulting in the formation of an EPDM terpolymer using ROMP chemistry. The EPDM terpolymer may then be chemically reacted with a norbornene-based phosphinate cross-linking material to form a flame-retardant, cross-linked EPDM rubber. FIG. 2 illustrates that utilization of a norbornene-based phosphinate material as a cross-linking agent may allow for incorporation of a flame retardant agent (phosphorus) directly into a backbone of an EPDM rubber material.

Figure 3:
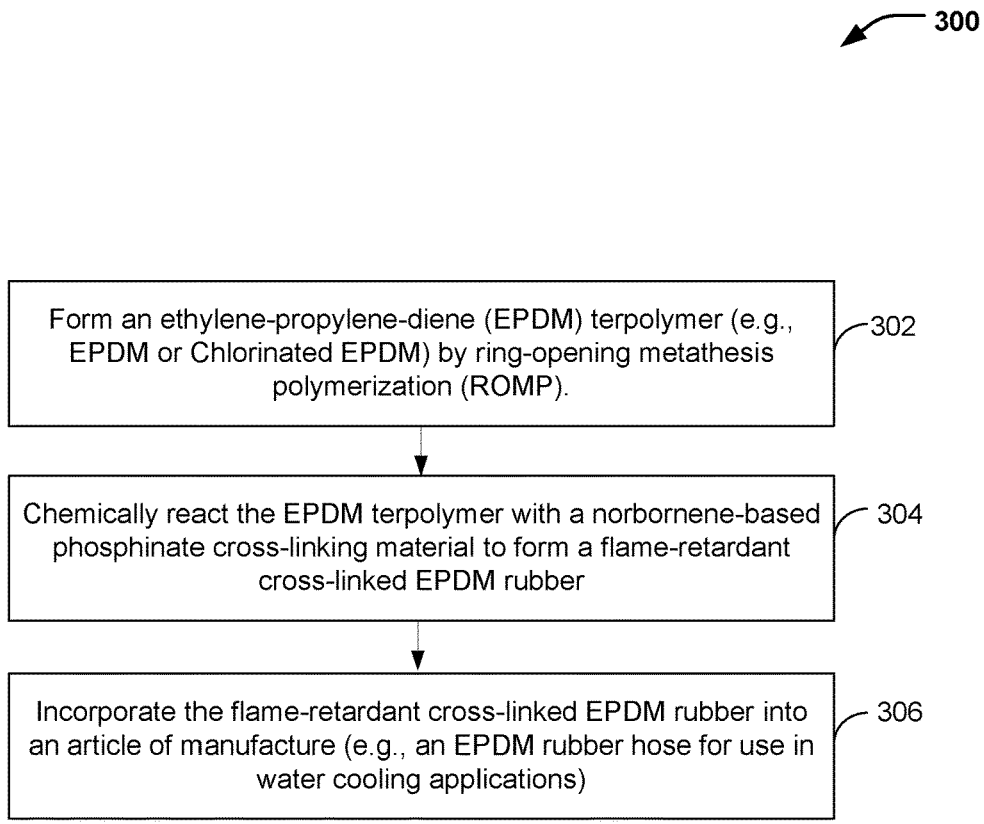
FIG. 3 is a flow diagram showing a particular embodiment of a process of forming a flame-retardant, cross-linked EPDM rubber.

FIG. 3 is a flow diagram of a particular embodiment of a process 300 of forming a flame-retardant, cross-linked EPDM rubber. FIG. 3 illustrates that ROMP chemistry may be used to form an EPDM terpolymer (e.g., chlorinated/non-chlorinated EPDM), and the EPDM terpolymer may be chemically reacted with a norbornene-based phosphinate cross-linking material to form a flame-retardant, cross-linked EPDM rubber. FIG. 3 illustrates that the flame-retardant, cross-linked EPDM rubber may be incorporated into an article of manufacture (e.g., an EPDM rubber hose for use in water cooling applications, among other alternatives).

The process 300 includes forming an EPDM terpolymer by ring-opening metathesis polymerization, at 302. As an example, referring to FIG. 1, a chlorinated ethylene monomer, a propylene monomer, and a diene monomer may be combined to form a mixture, and the mixture may be polymerized to form the chlorinated EPDM terpolymer (e.g., using ROMP chemistry). As another example, referring to FIG. 2, an ethylene monomer, a propylene monomer, and a diene monomer may be combined to form a mixture, and the mixture may be polymerized to form the EPDM terpolymer (e.g., using ROMP chemistry).

The process 300 includes chemically reacting the EPDM terpolymer with a norbornene-based phosphinate cross-linking material to form a flame-retardant, cross-linked EPDM rubber, at 304. As an example, referring to FIG. 1, the chlorinated EPDM terpolymer may be chemically reacted with the norbornene-based phosphinate material to form the flame-retardant, cross-linked chlorinated EPDM rubber. As another example, referring to FIG. 2, the EPDM terpolymer may be chemically reacted with the norbornene-based phosphinate material to form the flame-retardant, cross-linked EPDM polymer.

In the particular embodiment illustrated in FIG. 3, the process 300 includes incorporating the flame-retardant, cross-linked EPDM rubber into an article of manufacture, at 306. As an illustrative, non-limiting example, the flame-retardant, cross-linked EPDM rubber material(s) of FIG. 1 and/or FIG. 2 may be incorporated into an EPDM rubber hose for use in a water cooling application (among other alternatives).

Thus, FIG. 3 illustrates an example of a process of forming a flame-retardant, cross-linked EPDM rubber via a chemical reaction of a chlorinated/non-chlorinated EPDM terpolymer (formed via ROMP chemistry) with a norbornene-based phosphinate material. The norbornene-based phosphinate material may allow for incorporation of phosphorus directly into an EPDM polymer backbone for flame retardancy as well as cross-linking of EPDM polymer chains.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A process comprising:
polymerizing a mixture that includes an ethylene monomer, a propylene monomer, and a diene monomer to form an ethylene-propylene-diene (EPDM) terpolymer; and
chemically reacting the EPDM terpolymer with a norbornene-based phosphinate material to form a flame-retardant EPDM rubber.

2. The process of claim 1, wherein the ethylene monomer includes chlorinated ethylene.

3. The process of claim 1, wherein the diene monomer includes 5-ethylidene-2-norbornene, 5-propylidene-2-norbornene, or a combination thereof.

4. The process of claim 1, wherein forming the EPDM terpolymer includes using a mixture of Cp*TiMe$_3$ and B(C$_6$F$_5$)$_3$ as a catalyst material.

5. The process of claim 4, wherein at least a portion of the catalyst material remains after formation of the flame-retardant EPDM rubber.

6. The process of claim 1, further comprising chemically reacting a norbornene-based alcohol and a phosphinate material to form the norbornene-based phosphinate material.

7. The process of claim 6, wherein the norbornene-based alcohol includes 5-norbornene-2-methanol.

8. The process of claim 6, wherein the norbornene-based phosphinate material includes 3-(hydroxyl(phenyl)phosphoryl)propanoic acid.

9. A process comprising:
polymerizing a mixture that includes a chlorinated ethylene monomer, a propylene monomer, and a diene monomer to form a chlorinated ethylene-propylene-diene (EPDM) terpolymer;
chemically reacting a norbornene-based alcohol and a phosphinate material to form a norbornene-based phosphinate material; and
chemically reacting the chlorinated EPDM terpolymer with the norbornene-based phosphinate material to form a flame-retardant chlorinated EPDM rubber.

10. The process of claim 9, wherein a weight percentage of the chlorinated ethylene monomer is in a range of 30 to 80 weight percent of the mixture.

11. The process of claim 9, wherein a weight percentage of the diene monomer is in a range of 2 to 10 weight percent of the mixture.

12. The process of claim 9, wherein the norbornene-based alcohol includes 5-norbornene-2-methanol.

13. The process of claim 9, wherein the norbornene-based phosphinate material includes 3-(hydroxyl(phenyl)phosphoryl)propanoic acid.

14. The process of claim 13, wherein the diene monomer includes 5-ethylidene-2-norbornene, 5-propylidene-2-norbornene, or a combination thereof.

15. The process of claim 9, wherein forming the EPDM terpolymer includes using a mixture of Cp*TiMe$_3$ and B(C$_6$F$_5$)$_3$ as a catalyst material.

16. The process of claim 13, wherein the flame retardant EPDM rubber includes phosphorus in a backbone of the EPDM terpolymer.

\* \* \* \* \*